Jan. 13, 1948.    H. M. MARC    2,434,465
MANUFACTURE OF DUCTS
Filed May 20, 1944
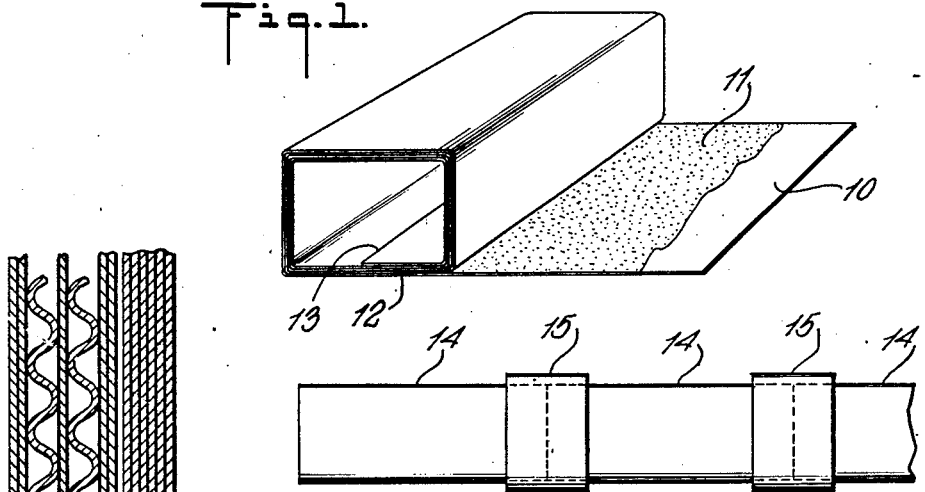
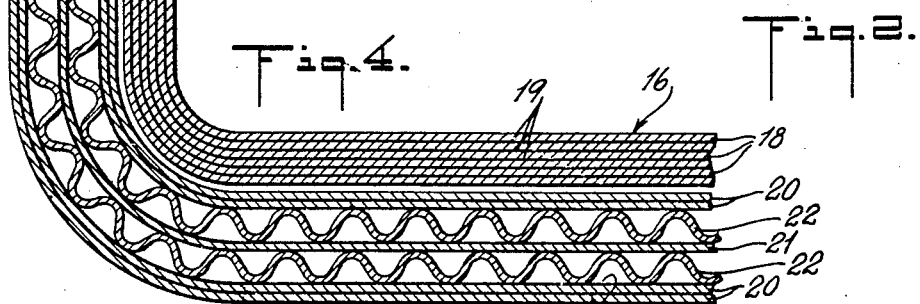
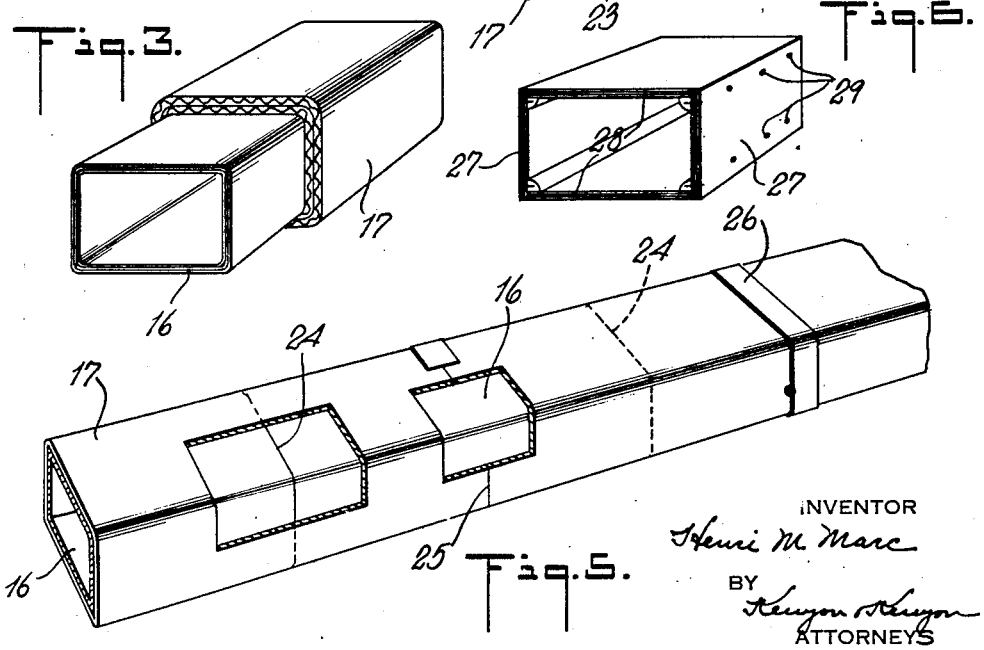
INVENTOR
Henri M. Marc
BY
Kenyon & Kenyon
ATTORNEYS Patented Jan. 13, 1948

2,434,465

UNITED STATES PATENT OFFICE 2,434,465

MANUFACTURE OF DUCTS

Henri M. Marc, Cincinnati Ohio, assignor to The Philip Carey Manufacturing Company, a corporation of Ohio Application May 20, 1944, Serial No. 536,475

3 Claims. (Cl. 154—83)

This invention relates to the manufacture of ducts. It relates particularly to the manufacture of ducts for the transmission of gases or vapors therethrough. For example, ducts manufactured according to this invention are highly desirable for use in heating or air conditioning equipment for buildings as the conduits for transmission of conditioned air from a suitable source such as a heating unit, a cooling unit, a humidifier or the like to the various locations or rooms to which the conditioned air is to be directed.

It is a purpose of this invention to provide ducts of the character aforesaid which instead of being metallic, utilize non-metallic material to provide rigid and structurally strong walls. It is a further purpose of this invention to provide ducts which while non-metallic are both resistant to heat and resistant to moisture and to water.

The manufacture of non-metallic ducts suitable for heating, ventilating, air conditioning and the like presents many difficulties. Materials such as wood, fiber board made of organic fibers, and the like are unsuitable for such purposes due to lack of heat and fire resistance and lack of resistance to moisture and to water. Ducts are commonly used in connection with units for supplying heated air and should not be adversely affected by high temperatures. Even relatively mild temperatures are likely to result in odors or smoke but even more important is the fire hazard that results if the duct material is not highly resistant to combustion or disintegration due to heat such as may be encountered due to improper operation of a heating unit or the occurrence of a fire in the building, for ducts of the type in question tend to act as flues that tend to spread fire very rapidly unless the walls are sufficiently heat and fire resistant to confine the heat or fire within the walls of the duct and prevent any fire from coming into contact with combustible material that may be adjacent the ducts.

If a non-combustible material such as asbestos fiber is used, the problem remains of successfully fabricating such non-combustible material into a duct suitable for the purpose intended. If an asbestos paper is formed into shapes suitable for lengths of ducts utilizing an organic adhesive material such as thermoplastic or thermosetting resins, casein, rubber, asphalt or the like, the advantage of using non-combustible fibers is largely lost due to the fact that such organic adhesive materials are lacking in resistance to heat. Such adhesives tend to soften or otherwise lose their effectiveness when subjected to heat. They tend to decompose or change their properties when heated to 300° F. and many will burn or even explode when heated to 400° F. or more. Moreover, even at lower temperatures they tend to give off unpleasant odors or injurious gaseous fumes.

Use of a non-combustible adhesive material such as sodium silicate in combination with a non-combustible material such as asbestos fiber paper will afford ducts of high heat and fire resistance, but any such adhesive materials, being water-soluble, are unsuitable since the duct is not sufficiently resistant to moisture and to water. Ducts installed in buildings may be subjected to water or moisture under various conditions. Thus the ducts in a building may be installed before the walls or roof of the building are completed and a rainstorm may destroy or damage the installed ducts wherever the rain comes in contact with them. Similar damage may be occasioned by a leaking or broken water pipe. Moreover, even humid air will cause weakening and softening of the walls of a duct that utilizes a water-soluble adhesive such as sodium silicate with resultant sagging or rupture of the walls of the duct. Obviously, a duct made utilizing a water-soluble adhesive such as sodium silicate will not be suitable for the transmission of air or gas containing a substantial quantity of moisture such as is commonly the case with air conditioning equipment designed to supply humidification.

An inorganic adhesive material such as sodium silicate may be insolubilized by reacting the silicate with a compound of a metal that converts the soluble alkali silicate to an insoluble metal silicate. However, attempts along this line for providing water-resistant and heat-resistant bonding material for a water-resistant and heat-resistant material such as asbestos fiber have resulted in further difficulties. Thus the use of compounds that tend to convert the soluble silicate to insoluble form also tend to make the adhesive unsuited for proper application to the asbestos paper sheets or, if this is not the case, the alkali silicate is not rendered sufficiently insoluble to give the resulting product the requisite wet strength.

Other problems and difficulties that are encountered in attempting to fabricate ducts from asbestos paper using a soluble silicate adhesive, relate to the obtaining of a strong bond between the adhesive and the paper, the prevention of undue softening by moisture of the body portion of the layers of asbestos paper, the prevention of undue temporary weakening of the paper during application of the adhesive, the necessity for allowing an excessive amount of time for setting the adhesive so that the duct may be handled, the requirement of excessive heat for curing when heat curing is resorted to, the tendency during drying and/or heat curing to form blisters or air pockets between the plies of asbestos paper, and the like.

It is a purpose of this invention to overcome difficulties of the character aforesaid in the fabrication of ducts from fibrous sheet material composed predominantly of heat-resistant fibers, preferably asbestiform mineral fibers, by utilizing an insolubilized alkali silicate adhesive composition to integrally unite a plurality of layers of the fibrous sheet material into a rigid wall structure that is highly resistant to heat and that is highly resistant to moisture and to water.

It is a principal feature of this invention that a plurality of layers of heat-resistant fibrous material such as asbestos fiber are integrally united by utilizing as the adhesive for combining the layers into a strong and rigid wall structure an adhesive composition comprising sodium silicate and potassium silicate within certain critical limits, namely, a mixture wherein the potassium silicate constitutes about 10% to about 40% by dry weight of the total alkali silicate and preferably about 15% to about 30% by dry weight of the total alkali silicate. Compounds of sodium and compounds of potassium for most purposes are regarded as equivalents. I have found, however, that sodium silicate and potassium silicate have decidedly different characteristics and properties affecting their suitability for use in the fabrication of heat- and moisture-resistant ducts. When an alkali silicate such as potassium silicate or sodium silicate is used as a bonding agent, the hardening of the bonding material results from the formation of precipitated silica gel which, however, in the presence of residual alkali is redispersible in water. I have found that it is much more difficult to prevent the redispersion in water of a silica gel formed from sodium silicate, as compared with a silica gel formed from potassium silicate, the silica gel being formed by such expedients as drying, heating, reaction with setting agents, and the like. On the other hand I have found that the sodium silicate has initial bonding or adhesive properties that are greater than those of potassium silicate. These differences, as well as others that I have discovered as a result of my research, result in the fact that using either sodium silicate by itself or potassium silicate by itself, difficulties are encountered that prevent the fabrication of commercially satisfactory ducts.

By utilizing a mixture of potassium silicate and sodium silicate within the critical range above given, the mixture has been found to possess a combination of properties and advantages not possessed by either of the alkali silicates by themselves. One of these advantages is the improved resistance to moisture of the completed duct that is provided by modifying sodium silicate with potassium silicate. It is also the case that while sodium silicate used as an adhesive normally has greater initial adhesiveness than potassium silicate, the addition of potassium silicate improves the ultimate bond and affords a stronger duct wall both when dry and when moistened. The employment of the potassium silicate within the limits above mentioned also improves the initial wetting of the fibrous sheet materials and facilitates the application of the bonding material uniformly throughout the lateral extent of such sheet material but without, however, excessive penetration or absorption into the fibrous sheet material. This latter characteristic is very helpful in minimizing the occurrence of air pockets due to faulty adhesion between portions of the surface area of the laminations of the fibrous sheet material. The use of the potassium silicate with the sodium silicate also has the effect of facilitating removal of moisture from the fabricated duct after initial forming and decreases the setting time to a very substantial degree. Thus, by use of the potassium silicate with the sodium silicate, the drying time required to set the duct sections so that they can be handled can be decreased from about 16 hours to about 3 hours. Another disadvantageous property of sodium silicate is its tendency to develop blisters during drying, especially if attempt is made to accelerate drying by heat and this tendency to blister is very greatly reduced by the addition of the potassium silicate to the sodium silicate. More generally, the mixture of potassium silicate with sodium silicate within the limits above mentioned provides the base for an adhesive that is essentially different in its behavior and properties from either sodium silicate or potassium silicate and that is of special applicability and advantage in meeting the problems incident to the fabrication of non-metallic ducts by integrally uniting plies of heat-resistant fibrous sheets such as asbestos paper.

The alkali silicates that are used may be of ordinary commercial grade. One widely sold sodium silicate is 42° Bé. solution containing about 38.7% of solids, the ratio by weight of $Na_2O$ to $SiO_2$ being about 1 to 3.2. Potassium silicate is considerably more expensive than sodium silicate and for this reason its commercial use is extremely limited, but it can be obtained on the market and one such solution is a 24° Bé. solution containing about 27.3% solids, the ratio by weight of $K_2O$ to $SiO_2$ being about 1 to 2.5. While the solutions of alkali silicate which have been mentioned as typical, are suitable, other alkali silicate solutions of varying concentrations and of varying ratio of alkali to silica may be used. It is ordinarily preferable, however, that in the mixed alkali silicate the ratio by weight of $Na_2O+K_2O$ to $SiO_2$ be between about 1 to 2.5 and about 1 to 3.5. The extent of dilution is optional although it is usually desirable not to employ more water than is required to keep the silica from prematurely precipitating and to maintain the adhesive composition of a consistency suitable for application. Excessive dilution of the silicate solution renders it too readily absorbable by the layers of bibulous paper and impairs the bond between the plies.

In order to insolubilize the alkali silicate so that the duct will have high resistance to moisture I preferably employ a calcareous hydraulic cement in conjunction with the mixed potassium and sodium silicates. Ordinary Portland cement may be employed for this purpose. Portland cement is a fritted mixture of calcareous and argillaceous mineral which has been ground and which usually contains a small amount of gypsum ($CaSO_4$) to retard the set. Portland cement consists of lime and silica in one or more compounds of calcium silicate, together with some alumina and small quantities of oxides of other metals. Unhydrated Portland cement usually contains some unhydrated or "free" lime up to about 2% while after hydration the amount of free lime (calcium hydroxide), Ca(OH)$_2$, liberated by hydrolysis of the calcium silicates, may increase to the extent of about 15%. An especially suitable Portland cement is a commercial product which is designated "Columbia Q-22" and which is prepared from selected raw materials low in iron content that tends to cause discolorations. The Q-22 cement is somewhat lighter in color than ordinary Portland cement. Another hydraulic cement which is suitable is "special stone set" cement ("Medusa") which is prepared by intergrinding about equal parts of light colored Portland cement and marble chips.

Another hydraulic cement that is suitable is aluminous cement which consists principally of calcium aluminate. It is prepared from limestone and bauxite by heating those materials together until they become reduced to a fused mass (as distinguished from merely fritting or sintering) and then casting the resulting fused materials which form, upon cooling, a compact, hard and basalt-like mass that is subsequently crushed and ground. This type of cement is sold under the trade name "Lumnite" and is also known as fused cement, electrofused cement, or Ciment Fondu. Aluminous cement is of very dark color, and this fact makes its use less desirable when a light color is desired. While aluminous cement contains a relatively large proportion of aluminum compounds, it also contains a relatively large proportion of calcium compounds and therefore is to be regarded as a calcareous cement as this term is used herein and in the claims.

It is preferable to employ calcareous hydraulic cement as an insolubilizing agent for the alkali silicate. The amount of calcareous cement, when used, desirably is such that the ratio by dry weight of alkali silicate to calcareous cement is between about 4 to 3 and about 1 to 2.5, such ratio preferably being between about 1 to 1 and about 1 to 1.5. While the alkali silicate may, and probably does, react with calcareous cement or other insolubilizing agent to produce insoluble silicate materials, such ratios as those given above and elsewhere herein, have, even in the case of the cementitious bonding material in hardened and insolubilized condition, been calculated to the alkali silicate basis for purposes of simplicity of definition.

The effect of a calcareous hydraulic cement on the mixed alkali silicate varies somewhat with the type of cement that is employed. Thus regular Portland cement tends to set the silicate quite rapidly while the aluminous cement causes the alkali silicate to set considerably more slowly. A Portland cement which sets slowly is preferred to quick setting types since it is more readily applied and affords a product of higher wet strength. When it is desired to use hydraulic cement with mixed potassium and sodium silicates it is frequently desirable to facilitate application of the adhesive to fibrous sheets in the commercial fabrication of ducts by employing a retarder which acts to retard the setting of the soluble silicate that is accelerated by the hydraulic cement. In this connection the effect of a fused cement such as aluminous cement is not great and a working life of the adhesive composition of several hours is provided even when no retarder is employed. If a retarder is used some suitable retarder may be employed, preferably, either sodium phosphate or sodium fluoride or a mixture of these materials. Tri-potassium phosphate is also suitable. In the usual case it is preferable to employ a mixture of tri-sodium phosphate and sodium fluoride (the corresponding potassium salts may be substituted for either or both of these materials), particularly when ordinary Portland cement is employed, including the Columbia Q-22 cement. In addition to the foregoing, other materials such as certain sugars serve to retard the setting of the alkali silicate adhesive and any suitable retarder can be used if it is desired to extend the working life of the adhesive composition in order to facilitate the fabrication of ducts.

The cementitious bonding material as applied ordinarily consists essentially of the solution of mixed potassium silicate and sodium silicate plus the calcareous cement, the amount of any other ingredient being small. However, inert filler materials such as fine sand, calcium carbonate, silica flour, slate flour, fly ash and the like may be employed. An excess of such filler which would excessively increase the consistency of the adhesive composition is avoided, and ordinarily it is desirable that the adhesive composition as applied have a viscosity of about 300 to 1000 centipoises at 77° F. The preferred range of viscosity of the adhesive composition is about 400 to 700 centipoises. The mixed potassium and sodium silicate plus calcareous hydraulic cement usually constitutes the major proportion by dry weight of the adhesive composition. There are several types of finely divided metallic oxides that are not suitable as fillers since they tend to react with the soluble silicate to precipitate it prematurely and when reference is made to an inert filler the reference is to a filler which does not react with the soluble silicate to precipitate it so rapidly as to interfere with proper application of the adhesive composition to the fibrous sheet material. By use of filler, the consistency of the adhesive composition can be controlled so as to be appropriate for application to fibrous sheets of different absorptiveness. When the fibrous sheet material is highly absorptive the employment of some inert filler is desirable to prevent such rapid absorption of the adhesive material as to leave insufficient adhesive on the surface for adequately bonding the fibrous sheets together. Of the total solids in the adhesive composition about 30% to 50% by weight (dry) and preferably about 35% to 40% by weight should be alkali silicates.

There is one type of filler material, namely clays, that has special advantages for use in the cementitious bonding adhesive, since the insolubilization of the soluble silicate is more complete when it is insolubilized in the presence of a substantial amount of clay. In fact a fairly high degree of insolubilization can be afforded merely by the action of clay and without the employment of any other insolubilizing agent such as a calcareous hydraulic cement. The insolubilization that is afforded by the presence of clay is attained when the wall structure after initial fabrication and drying is heated, the heating in the presence of clay effecting an improved curing and insolubilization of the soluble silicate. It is preferable to employ a kaolinitic clay or other non-swelling clay. A sedimentary kaolinitic clay such as that known as Girard clay (produced by United Clay Mines, Inc., Trenton, N. J.) has been found to be suitable. An airfloat clay such as that known as Tako clay (produced by Thomas Alabama Kaolin Co.) is also suitable. Clays of the montmorillonite type are also suitable. It is desirable to have clay present so that the ratio by dry weight of the clay to the alkali silicates is between about 1 to 20 and 1 to 2 and preferably is between 1 to 12 and 1 to 4. The maximum amount of clay that is present is limited only by the consistency of the adhesive composition, namely, the amount of clay should not be so great as to render the adhesive composition unsuitable for spreading.

In the fabrication of ducts I prefer to employ fibrous sheet material such as a good grade of asbestos paper. In the manufacture of asbestos paper the usual paper grades of asbestos fiber about ⅛ to ¼ inch in length or less may be employed and are suitable for the purpose although by utilizing longer fibers the grade of the paper can be improved and it is possible to employ a smaller quantity of a preliminary binder such as starch which is usually employed for the purpose of imparting sufficient mechanical strength to enable handling and manipulation of the paper. Such asbestos paper does not necessarily have to be composed solely of asbestos fiber and in fact asbestos paper often contains a small amount of sulphite fiber or newsprint, but usually this is less than 10% by weight of the fiber in the paper. More generally the paper desirably should consist in major proportion of asbestiform mineral fibers and preferably at least about 80% by weight of the fiber should be asbestiform mineral fiber. Considering the paper as a whole, including any binder or filler material contained therein, it should ordinarily consist predominantly of fire-resistant material such as mineral fiber or a filler such as clay which is neither combustible nor subject to smoking and disintegration and preferably at least about 75% of the paper should be composed of such fire-resistant material. If more than about 10% of the paper consists of organic material, the duct is liable to smoke excessively when subjected to high temperatures. In lieu of asbestos fibers a mineral fiber such as rock wool or slag wool or glass fibers may be employed, but such materials tend to break down during processing and ordinarily are not suitable except in relatively small amount in conjunction with asbestos fibers. When, however, such mineral fibers are employed, any such fibers are regarded as the equivalent of asbestos fibers and when reference is made to asbestiform mineral fibers any fibers of rock wool, slag wool, glass wool or the like are to be regarded as comprised in the asbestiform mineral fiber.

If organic fiber is included in the fibrous sheet material such fibers can be commingled with the sheets of asbestiform mineral fiber. If desired, such organic fibers can be made into a separate sheet and used between or in conjunction with sheets consisting essentially or predominantly of asbestos fibers, but preferably the amount of organic fiber in the laminated structure as a whole is within the limits mentioned hereinabove. When organic fiber is present the heat- and fire-resistance thereof may be increased by treating them with a non-combustible or combustion-retarding material such as chlorinated naphthalene, chlorinated paraffin, chlorinated diphenyl, chlorinated rubber, synthetic chlorine-containing rubber-like materials such as that known as "neoprene," and the like. Treatment of organic fibers with such materials, while increasing their resistance to combustion, does not, however, prevent the occurrence of smoke if the fibrous sheet material is exposed to high temperatures adjacent to combustion temperatures. Such treating materials can likewise be utilized as the temporary binder in the fibrous sheet material in lieu of starch. There are other substances such as soluble phosphates, borates, sulphamates and the like which also inhibit combustion, but these latter materials have the disadvantage of being water-soluble.

While it is distinctly preferable to employ fibrous sheet material consisting predominately or essentially of asbestiform mineral fibers, a duct of lesser resistance to heat can be made in the practice of this invention that consists predominantly or even entirely of organic fibers which preferably have been treated to make them more heat-resistant, e. g., as in any of the manners hereinabove described. The term heat-resistant fibers is to be regarded as including such fibers, other than asbestiform mineral fibers, which have been treated so as to render them substantially non-combustible in the sense that they do not, after having been ignited, sustain combustion.

As the preliminary binder, other binder materials, particularly those known as "wet strength" resins may be employed, such as urea-aldehyde resins, phenol-aldehyde resins, and the like. Melamine resins and vinylidine resins, vinyl acetate, vinyl chloride, etc., are also suitable. Proteinaceous binder materials are also operable, but tend to have an unpleasant odor, especially when heated.

While organic binders are suitable as the preliminary binder material it is preferable to employ an inorganic heat-resistant binder since such binders do not tend to give off smoke or odors when heated. One such binder which is especially desirable is clay. The use of clay not only is advantageous due to its non-combustibility, but also is advantageous in that it has an insolubilizing effect upon any soluble silicate that penetrates into the paper. When soluble silicate is applied to a porous paper, the silicate tends to be absorbed into the paper more deeply than the hydraulic cement or clay that is included in the adhesive composition and is thereby carried outside of the zone where the insolubilizing agent is present. When clay is incorporated in the paper any such alakali silicate that is carried into the paper is subjected to the insolubilizing action of the clay which is advantageous.

In the fabrication of a duct the sheet of fibrous heat-resistant fiber is ordinarily such that it weighs about 4 to 15 pounds per 100 square feet and preferably weights about 7 to 12 pounds per 100 square feet. When layers of such paper are made up into a laminated structure and are integrally united with the adhesive and cementitious binding composition above described a rigid wall structure is afforded having the heat-resistant and water-resistant properties aforesaid.

In the fabrication of ducts, the fibrous sheet material is preferably bibulous and absorptive of the adhesive binding composition used to integrate into a rigid wall structure the layers of fibrous sheet material. The sheet material, if it contains a binder, preferably does not contain the binder in sufficient amount to fill the pores and interstices of the paper. It is desirable that the paper be capable of absorbing water to the extent of at least about 40% by weight of the dry paper when immersed in water at 77° F. for about 1 minute. It is likewise preferable that the paper be substantially non-water repellent, namely, that the paper not contain a water-repellent material of a waxy or oily character in an amount that prevents wetting of the paper or that prevents penetration of the adhesive composition a substantial distance into the paper. While the filling of the fibrous sheet material with a water-insoluble binder or the incorporation into the sheet material of a water-repellent material as by deposition from the paper furnish or subsequent application tends to increase the water-resistance of the sheet material in the absence of the alkali silicate binding composition, such materials tend to impair the bond and tend to prevent the alkali-silicate from becoming insolubilized in situ while penetrating substantially into the fibrous sheet material. Moreover, when the duct is fabricated from bibulous fibrous sheet material, water applied to the duct may to some extent dissolve the alkali silicate in the adhesive layers, but if this is the case any dissolved alkali silicate will be carried along into the body of the sheet material with the result that when the duct wall dries out, its redried strength may be greater than its original strength due to the fact that the alkali silicate is caused to penetrate more thoroughly into the layers of fibrous sheet material so as to provide a better overall bond upon redrying the duct.

In the usual case the duct wall structure contains from about 10% to about 30% by dry weight of the cementitious bonding material and preferably about 12% to about 18% by weight of the cementitious bonding material, the wall structure being a composite of the fibrous and cementitious materials.

Further objects, features and advantages of this invention and of the fabrication of ducts according to this invention are brought out in connection with the following description of certain illustrative embodiments of this invention which are shown in the accompanying drawings, wherein:

Fig. 1 is a perspective view of a length of duct embodying this invention in a partially completed condition;

Fig. 2 is a side elevation of a duct illustrating a simple form of duct construction comprising a plurality of lengths of duct united together;

Fig. 3 is a perspective view of a preferred type of duct construction including a core member and an outer insulating member;

Fig. 4 is an enlarged section of a composite duct such as that shown in Fig. 3, which illustrates the laminated construction of the duct walls;

Fig. 5 is a perspective view of an assembly of several lengths of duct of the type shown in Fig. 3 with portions of the duct jacket cut away; and Fig. 6 is an alternative form of duct that may be fabricated according to this invention.

Referring to the drawings, there is shown in Fig. 1 a duct length in a state of nearly-complete fabrication. The sheet material 10, such as asbestos paper, is formed into a duct by wrapping it on itself until a wall of desired thickness is obtained. This can be done by utilizing a mandrel having the cross sectional dimensions desired for the inside of the completed duct and winding the paper in the width desired, usually from about 2 to 4 feet, about the mandrel. Usually ducts for air conditioning purposes are rectangular as shown but they can, of course, be of any other desired shape and of any desired cross sectional dimensions. As each layer of the asbestos paper is applied the adhesive composition 11 of the kind above described is applied to one or both of the surfaces to be bonded together while the adhesive is in a suitable spreadable condition. The result is the fabrication of a wall 12 consisting essentially of a plurality of plies of the asbestos paper in integrally united relation. It is apparent that the wall thus provided is continuous in cross section and is seamless in cross section in the sense that there are no breaks or seams united solely by mechanical or adhesive means which might be subject to possible leakage from the duct. While there may be two or more ends of the asbestos paper sheet as at 13, this is not regarded as a seam. Ducts such as above described which have a continuous and seamless cross section are preferred. While in the embodiment shown the duct is formed from a single sheet of asbestos paper, a plurality of fibrous sheets of the same or different properties and composition, may, if desired, be employed in fabricating the duct length.

After the duct has been formed in the manner aforesaid, it is dried and, upon drying, the silicate adhesive composition becomes hardened and the wall of the duct becomes set to a rigid, strong, and tough wall structure. In order to accelerate insolubilization of the alkali silicate it is desirable to heat the duct to at least about 160° F. and preferably to at least about 200° F. or higher. In a typical operation the duct may be heated at a temperature of the order of 200° F. for about 2 hours to thoroughly dry the duct while at the same time accelerating the curing of the alkali silicate to render it insoluble, and then heating the duct for about one hour at a temperature of about 275° F. The heating should be of sufficient duration to bring the center plies of the product up to the desired curing temperature so that the center product will attain such temperature. When the paper contains organic material, e. g., an organic preliminary binder such as starch, it is usually not desirable to heat the duct to a temperature at which the organic material becomes discolored or decomposed. This varies with the amount and kind of binder material, but usually such discoloration or decomposition begins to take place at temperatures of the order of 300° F. to 350° F. If the amount of organic material is very low or has been eliminated as by use of clay as a preliminary binder or by incorporating long asbestos fibers into asbestos paper to give it strength, then the heat curing may be accomplished at still higher temperatures, e. g., at temperatures of the order of 500° F. to 700° F. The higher the curing temperature the more the insolubilization of the alkali silicate is accelerated and the more thoroughly it becomes insolubilized. In fact when mixed silicates are employed within the critical limits herein defined the cementitious material can be insolubilized sufficiently for most purposes by heat curing at a temperature of 700° F. or thereabouts without the presence of an insolubilizing agent such as calcareous cement and even though the filler in the cementitious composition consists of some relatively inert material such as calcium carbonate or slate flour.

The extent of curing of the duct by heating the duct after its formation and drying depends to some extent upon the composition of the adhesive composition. Thus, when the mixed potassium and sodium silicate is in the presence of a cement such as the Q–22 Portland cement, a substantial amount of insolubilization of the alkali silicate is afforded merely by drying the formed duct. In general, the presence of a material such as hydraulic cement which promotes the insolubilization of the alkali silicate reduces the temperature at which satisfactory insolubilization of the alkali silicate can be accomplished. When clay is present in the adhesive composition, curing at a temperature of at least 200° F. and preferably of at least 250° F., is desirable if the insolubilizing action of the clay is to be obtained.

In Fig. 2 a plurality of duct lengths 14 which may be of the type shown in Fig. 1, are arranged into a simple type of duct by means of collars 15 which encase the joints formed at the ends of the abutting duct lengths. The collars 15 may be made in the manner above described in connection with Fig. 1, but of such cross section as to slide over the periphery of the duct lengths. These collars preferably are held in place by application of an adhesive of the character described herein although other adhesive materials such as ordinary alkali silicate solution may be used.

In Fig. 2 a preferred type of duct construction is shown wherein the duct is provided with a permanent insulating layer. The duct of Fig. 3 has a core 16 which may be of the same type shown in Fig. 1. This core has solid walls which are strong and rigid and impart great strength to the duct. About this core is a jacket 17, which, in the enbodiment shown, comprises two sheets of corrugated asbestos paper, that by providing a cellular side wall, afford a very effective heat insulating layer about the core 16.

A portion of the wall structure of the core 16 and of the jacket 17 are shown on an enlarged scale in Fig. 4. The core is seen to be composed of six layers 18 of asbestos paper with an adhesive binding layer 19 between the adjacent layers. The number of layers of asbestos paper will depend upon the weight and caliper of the asbestos paper used and upon the strength desired in the wall structure, which in turn, will vary with the size of the duct.

The jacket 17 is seen to comprise on each side two essentially plane sheets of asbestos paper 20, and a central plane sheet of asbestos paper 21. Between the outer plane layers and inner plane layer are the corrugated sheets of asbestos paper 22. The jacket can be made in the manner illustrated in connection with Fig. 1 except that the corrugated sheets of asbestos paper are provided with corrugations and cemented to plane sheets of asbestos paper prior to being wrapped into the formed jacket. The different layers are bonded with cementitious bonding composition 23 of the character herein described. The jacket can be made of varying thickness and with varying number of plies of corrugated paper, depending upon the degree of strength and heat insulating effectiveness that is desired.

In Fig. 5 there is shown a typical duct construction using a jacketed duct of the type shown in Fig. 4. Preferably the lengths of core and lengths of jacket are staggered so that the abutting ends of the core will be at about the midportion of a jacket length and so that the abutting ends of the jackets will be at about the midportion of the core lengths. A portion of the jacket 17 is shown removed to show an abutting joint 24 between core lengths. Another portion of the jacket 17 in the region of the abutting joint 25 between jacket lengths has been removed to show that the core 16 is continuous in this region of the assembled duct. Between abutting ends of the jackets 16 at the joints 25 a suitable adhesive is used and a tape 26 may be applied over the joint, the tape consisting, for example, of a single layer of asbestos paper bonded to the exterior of the jacket by a suitable adhesive.

In Fig. 6 I have shown another duct construction in which my invention may be embodied. The duct consists of two vertical walls 27 and two horizontal walls 28 which may be made separately and united into a duct by means of some suitable securing means which may, as shown, consist of quarter rounds of wood suitably treated to render it fire-resistant, or other suitable material which are secured to the walls by suitable securing means such as screws 29 or an adhesive. The walls 27 and 28 of the duct shown in Fig. 6 may be made in essentially the same manner that has been described above for the fabrication of the other embodiments shown in the drawings, except that the layers of asbestos paper or the equivalent instead of being wrapped into a duct length of seamless and continuous cross section, are laid flat. The bonding of the layers into an integral rigid duct wall structure may be accomplished in the manner that has already been described.

This invention may be illustrated further in connection with the following example of a preferred embodiment of my invention. The adhesive composition contains the following materials.

| | Grams |
|---|---|
| Sodium silicate solution, 42° Bé | 75 |
| Potassium silicate solution, 28° Bé | 25 |
| Portland cement | 43 |
| Clay | 3 |
| $Na_3PO_4$ | 8.5 |
| NaF | 3 |

The solutions of potassium silicate and sodium silicate were mixed and the tri-sodium phosphate was dissolved therein. The sodium fluoride was first moistened to facilitate its incorporation. The Portland cement and clay were then added and the mass was mixed until a smooth, flowable, semi-fluid consistency was obtained.

Asbestos paper weighing about 7 pounds per 100 square feet and containing about 4% of organic fiber and about 5% of starch as a preliminary binder was then formed into a laminated wall structure by wrapping the paper about a mandrel. During the wrapping the adhesive was applied so that the dry weight of the solids in the adhesive layer constituted about 15% of the dry weight of the resulting duct wall. The asbestos paper was a non-water repellent paper having the capacity to absorb water to the extent of about 50% of its dry weight. The duct wall was made with ten laminations of the asbestos paper. After the wall had been formed it was air dried for 3 hours, heated at 200° F. for four hours and heated at 275° F. for four hours.

The resulting duct had exceptionally high strength both when dry and when wet, the strength when wet having been determined after a sample had been soaked for two hours in water at ordinary atmospheric temperature. Soaking in water is a test that is much more severe than any normal condition to which the duct will be subjected in service and this test was intended to be an accelerated test of the resistance of the duct to moisture. The strength when wet was considerably lower than the strength when dry as one would naturally expect as a result of soaking and softening the body of the asbestos paper, but the strength was still very substantial and more than adequate to prevent sagging, rupturing, or other disintegration of an installed duct as a result of soaking with water. It was significant that the cementitious bonding material was not appreciably affected by the soaking of the sample of duct wall in water and remained hard and continued to hold the different plies of the material together. It was also significant that the soaked sample upon redrying regained fully its original strength, thus demonstrating that a duct embodying this invention if accidentally soaked with water will not lose its shape while moist and upon redrying will be essentially as good as it was originally.

The foregoing desirable properties of duct embodying this invention result from the fact that in fabricating a duct according to this invention the various difficulties hereinabove enumerated are overcome. The wetting of the asbestos paper by the adhesive is improved and bond therewith and between the plies of asbestos paper are improved. High initial adhesiveness is provided during fabrication as well as high ultimate strength and improved resistance to water of the cementitious material. Moreover, the duct was made entirely free of air pockets and blisters. The overcoming of these difficulties and the advantages and improvements of this invention are of critical importance in the successful manufacture of ducts of the type referred to herein.

While it is preferable to employ calcareous hydraulic cement as an insolubilizing agent for the mixed potassium and sodium silicate, other insolubilizing agents may be employed. Thus clay by itself has considerable insolubilizing effect on the alkali silicate when the formed duct wall is subjected to heat curing, as has been pointed out above. Clay also has the advantage of not unduly accelerating the setting of the alkali silicate and no retarder need be employed. Other substances may also be used. As an insolubilizing agent, a substance such as calcium carbonate, calcium sulphate, barium carbonate, zinc oxide, calcined magnesite, etc., may be employed provided a retarder is also employed to prevent unduly rapid setting of the soluble silicate. More generally the alkali silicate can be insolubilized by reaction in situ with a compound of a metal the silicate of which is insoluble, a retarder being employed when such compound excessively reduces the setting time of the soluble silicate and with heat curing when heat is required to accelerate the reaction.

According to the invention hereinabove described a duct highly resistant to moisture and to water is provided. Moreover, the duct can be made of high resistance to fire and to heat. The degree of resistance to fire and to heat can be varied as desired by varying the content of combustible material in the duct as a whole. By employing the insolubilized alkali silicate adhesive in conjunction with an asbestos paper that is substantially free of either organic fiber or organic binder or other organic material, as may readily be accomplished in the practice of this invention, the duct can be made so as to be very resistant to high temperature and even direct contact with flame. For moderate heat resistance it is desirable that the duct as a whole consist predominantly of heat-resistant materials. In the ordinary case the duct will contain, in order to meet usual building requirements as to fire resistance, not more than 10% by dry weight of organic material or other non-fire resistant material. It is preferable that the duct contain less than 7% by dry weight of organic or other non-fire resistant material. In this connection the term "fire-resistance" as used herein is to be understood as applicable to materials such as asbestiform mineral fibers, clay, cement, etc., which not only do not support combustion but also do not char or give off smoke upon exposure to flame.

In addition to ducts in the form of straight lengths one can, of course, in the practice of this invention, fabricate suitable elbows, take-off sections, etc., as may be desired. Moreover, any vanes or reinforcing members used in the duct system may be fabricated utilizing the principles of this invention.

While this invention has been described in connection with certain examples of the practice thereof, it is to be understood that this has been done merely for purposes of illustration and that the practice of this invention may be varied within the scope of this invention as defined by the language of the following claims.

I claim:

1. In the manufacture of a heat- and moisture-resistant duct for the transmission of gases and vapors therethrough, the step comprising integrally uniting a plurality of layers of bibulous fibrous sheet material composed predominantly of non-combustible fibers to provide a wall structure comprised in said duct by applying between said layers of fibrous sheet material a spreadable aqueous adhesive composition having a viscosity of from 300 to 1000 centipoises at 77° F., consisting predominantly of a mixture of alkali silicate and calcareous hydraulic cement and containing a retarder, said alkali silicate consisting essentially of a mixture of sodium silicate and potassium silicate, the ratio by dry weight of said soluble silicate to said hydraulic cement being between about 4 to 3 and about 1 to 2.5, from about 10% to about 40% by dry weight of said soluble silicate consisting of potassium silicate and the soluble silicate constituting about 30% to about 50% by dry weight of said adhesive composition, and drying and heat-curing the so united layers at a temperature of about 200° F. to 700° F. thereby hardening and insolubilizing said adhesive composition in situ while carried by and between said layers of fibrous sheet material and unifying said layers into an integral rigid wall structure.

2. In the manufacture of a heat- and moisture-resistant duct for the transmission of gases and vapors therethrough, the steps comprising integrally uniting a plurality of layers of heat-resistant fibrous sheet material to provide a wall structure comprised in said duct by applying to said layers of fibrous sheet material a spreadable aqueous adhesive composition which has as the base alkali silicate consisting essentially of a mixture of sodium silicate and potassium silicate, from about 15% to 30% by dry weight of said alkali silicate consisting of potassium silicate, and which contains a compound of a metal the silicate of which is insoluble, and hardening and insolubilizing said adhesive composition by reaction of said alkali silicate with said compound in situ and by heat-curing while carried by and between said layers of fibrous sheet material to provide an integrated rigid wall structure.

3. In the manufacture of ducts for the transmission of gases and vapors therethrough, the steps comprising integrally uniting a plurality of layers of fibrous sheet material to provide a wall structure comprised in said duct by applying to said layers of fibrous sheet material a spreadable aqueous adhesive composition which has as the base alkali-silicate consisting essentially of a mixture of sodium silicate and potassium silicate, from about 10% to about 40% by dry weight of said alkali-silicate consisting of potassium silicate, and heat-curing and insolubilizing said adhesive composition at a temperature of approximately 700° F. while carried by and between said layers of fibrous sheet material to provide an integrated wall structure.

HENRI M. MARC.

REFERENCES CITED

The following references are of record in the file of this patent:

UNITED STATES PATENTS

| Number | Name | Date |
| --- | --- | --- |
| 1,876,357 | Stadtfeld | Sept. 6, 1932 |
| 1,876,783 | Stadtfeld | Sept. 13, 1932 |
| 1,045,459 | Todd et al. | Nov. 26, 1912 |
| 2,226,523 | Peck | Dec. 24, 1940 |
| 2,338,801 | Callan | Jan. 11, 1944 |
| 2,330,966 | Gottwald et al. | Oct. 5, 1943 |
| 696,059 | Line | Mar. 25, 1902 |
| 1,678,021 | Preble | July 24, 1928 |
| 489,927 | Carey | Jan. 17, 1893 |
| 2,081,643 | Scripture | May 25, 1937 |
| 2,233,973 | Dunn | Mar. 4, 1941 |
| 2,287,411 | Boller | June 23, 1942 |